United States Patent
Coleman et al.

(10) Patent No.: US 8,377,248 B2
(45) Date of Patent: Feb. 19, 2013

(54) METHOD AND SYSTEM FOR FORMING A COMPLEX MONOLITHIC THERMOSET PART

(75) Inventors: Robert Alexander Coleman, Mulvane, KS (US); Timothy Dean King, Wichita, KS (US); Steven Fillmore Hanson, Derby, KS (US); Leonard Lloyd Baca, Mulvane, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 255 days.

(21) Appl. No.: 12/816,568

(22) Filed: Jun. 16, 2010

(65) Prior Publication Data

US 2011/0308711 A1    Dec. 22, 2011

(51) Int. Cl.
*B29C 65/00* (2006.01)
*B32B 37/00* (2006.01)

(52) U.S. Cl. ........ 156/287; 156/285; 156/381; 156/382; 264/500; 264/510

(58) Field of Classification Search .................. 156/166, 156/169, 173, 184–190, 195, 285–287, 381, 156/382, 78, 191, 155; 264/219–221, 510–516, 264/571, 635; 249/142, 144
See application file for complete search history.

(56) References Cited

U.S. PATENT DOCUMENTS

| | | | |
|---|---|---|---|
| 3,988,103 A | 10/1976 | Hoffmeister | |
| 4,087,502 A | 5/1978 | Hoffmeister | |
| 4,126,659 A | 11/1978 | Blad | |
| 5,037,041 A | 8/1991 | Unterhitzenberger | |
| 5,057,174 A * | 10/1991 | Anderson et al. | 156/155 |
| 5,071,506 A | 12/1991 | Nelson et al. | |
| 5,087,193 A | 2/1992 | Herbert, Jr. | |
| 5,262,121 A | 11/1993 | Goodno | |
| 5,433,902 A * | 7/1995 | Leyderman | 264/29.1 |
| 5,454,895 A * | 10/1995 | Imparato | 156/156 |
| 5,469,686 A | 11/1995 | Pykiet | |
| 5,487,854 A | 1/1996 | Leoni | |
| 5,538,680 A | 7/1996 | Enders | |
| 5,683,646 A | 11/1997 | Reiling, Jr. | |
| 5,851,564 A * | 12/1998 | Triandafilou | 425/186 |
| 6,458,309 B1 * | 10/2002 | Allen et al. | 264/319 |
| 7,059,034 B2 | 6/2006 | Anderson et al. | |
| 7,250,124 B2 | 7/2007 | Boven et al. | |
| 7,431,239 B2 | 10/2008 | Anderson et al. | |
| 2004/0224139 A1 | 11/2004 | Backhouse | |
| 2005/0074593 A1 | 4/2005 | Day et al. | |
| 2005/0211843 A1 | 9/2005 | Simpson et al. | |
| 2006/0086735 A1 | 4/2006 | Weerth | |

* cited by examiner

*Primary Examiner* — Katarzyna Wyrozebski Lee
*Assistant Examiner* — Carson Gross
(74) *Attorney, Agent, or Firm* — Hovey Williams LLP

(57) ABSTRACT

A system and method for forming a hollow, complex, monolithic composite part. Composite material may be placed around the mandrel, then an internal impermeable membrane may be placed into and/or through tunnels formed in the mandrel. Next, an external impermeable membrane may be placed around the composite material and sealed against itself and the internal impermeable membrane such that the mandrel and the composite material are both contained in an airtight manner between the internal and external impermeable membranes. Air may then be removed from within the sealed impermeable membranes, compressing the impermeable membranes against the mandrel and/or the composite material. The consolidated composite material may be hardened to form the composite part. Finally, the impermeable membrane may be removed from around the hollow composite part and from within the mandrel, followed by removal of the mandrel from within the composite part by breaking it up into smaller pieces.

17 Claims, 10 Drawing Sheets

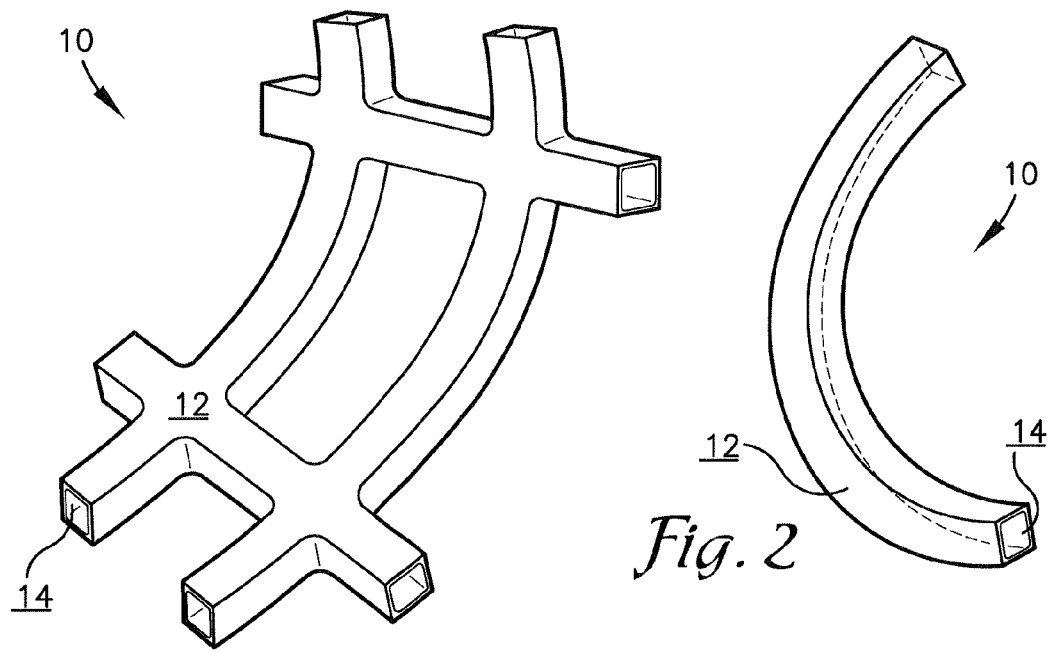
Fig. 1
Fig. 2
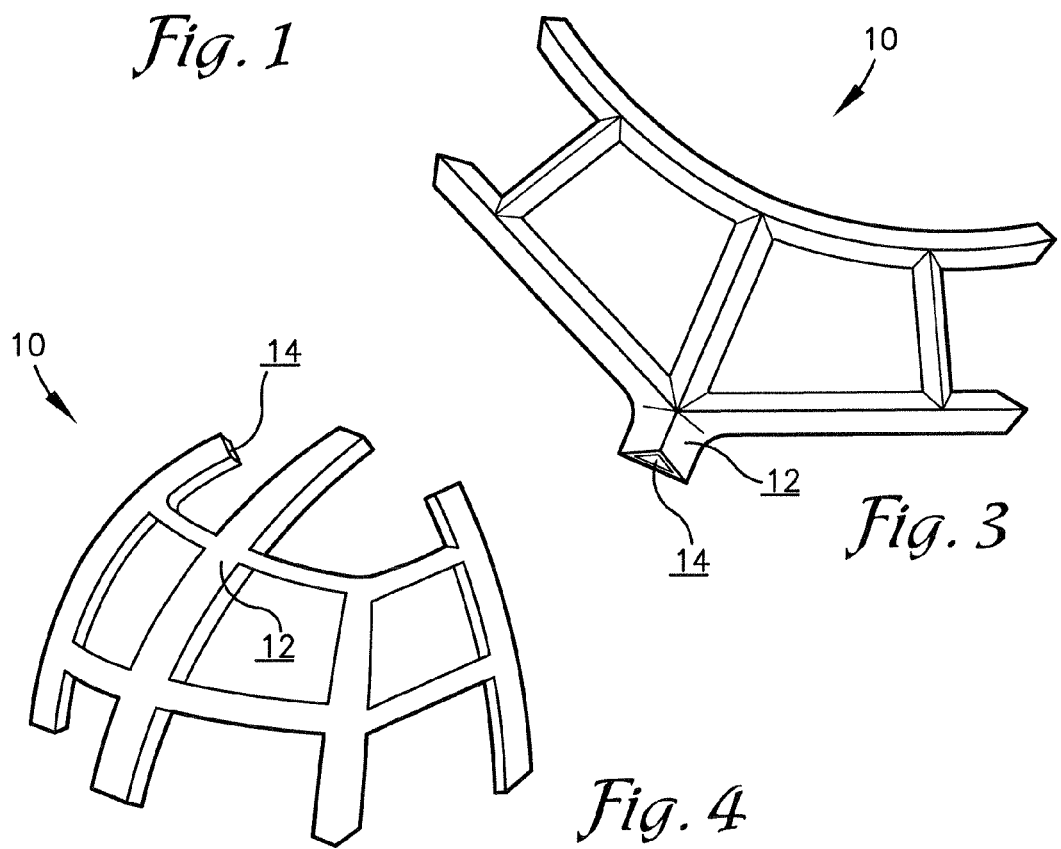
Fig. 3
Fig. 4

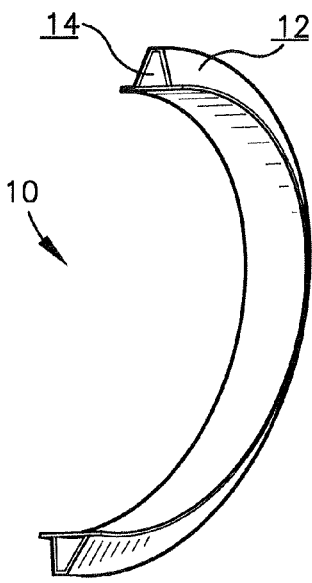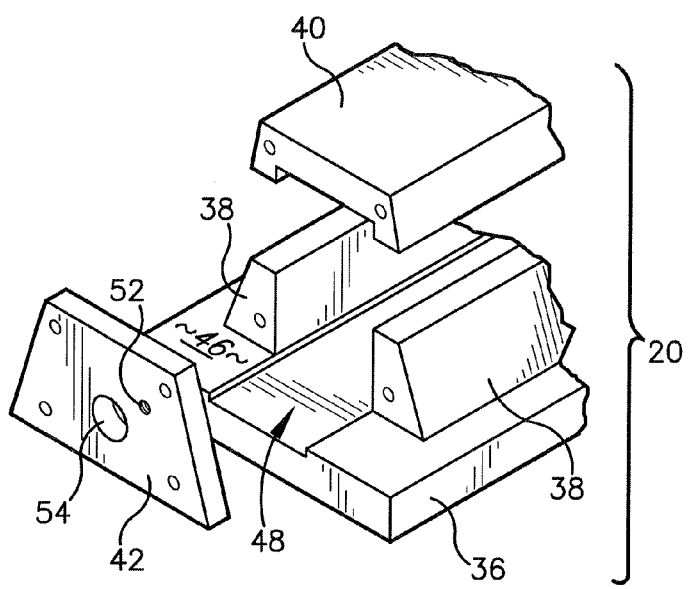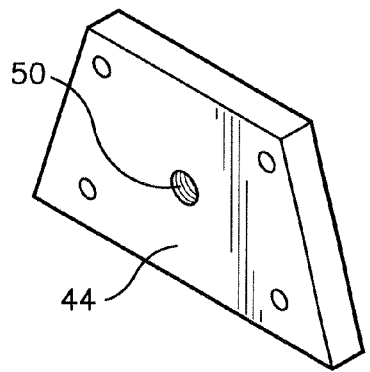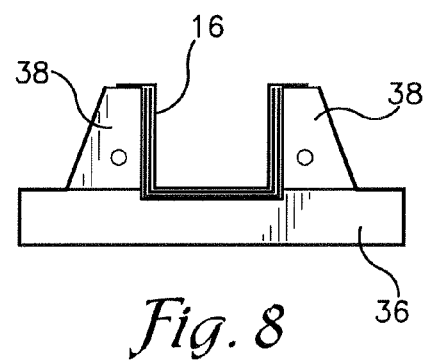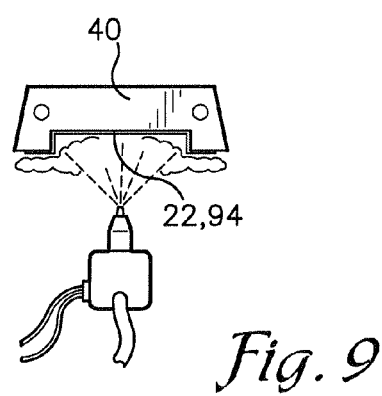

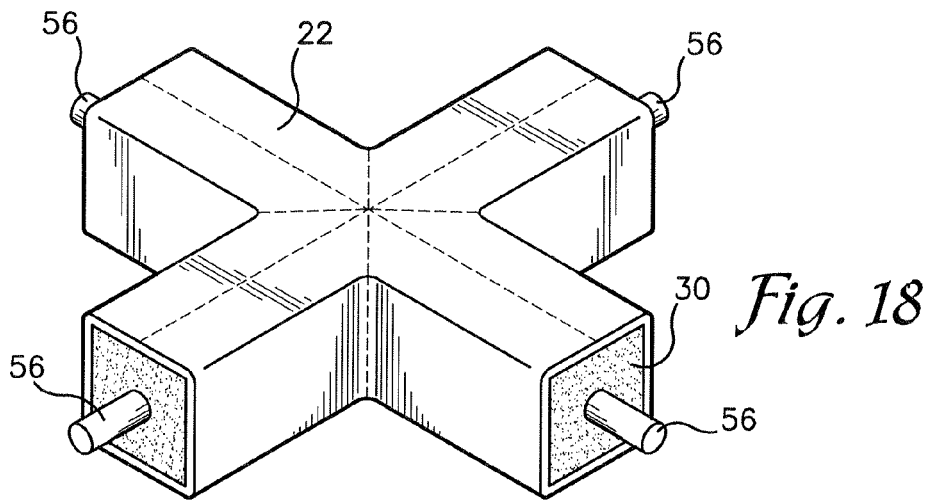
Fig. 18
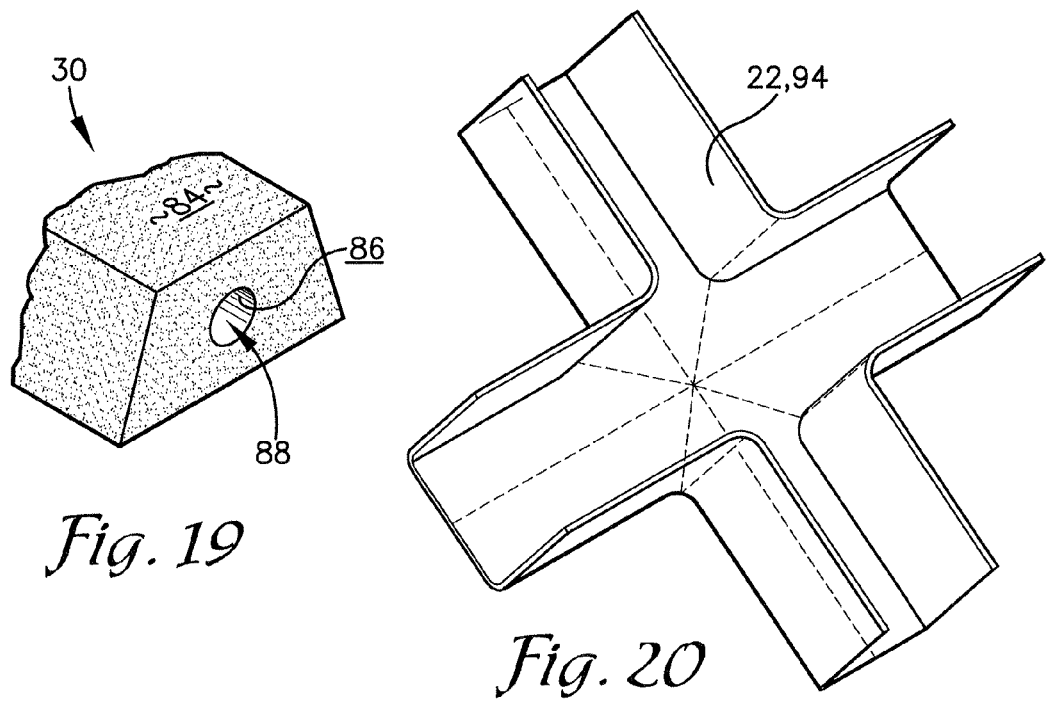
Fig. 19
Fig. 20
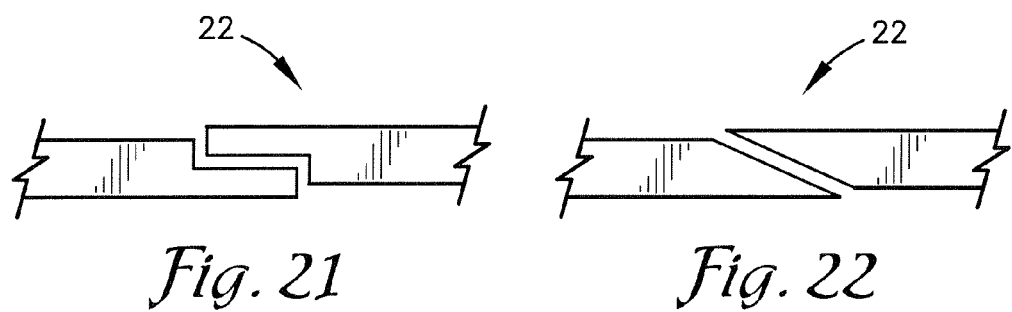
Fig. 21
Fig. 22

METHOD AND SYSTEM FOR FORMING A COMPLEX MONOLITHIC THERMOSET PART

BACKGROUND

1. Field

Embodiments of the present invention relates to a method and system for forming a complex monolithic composite part. More particularly, the present invention relates to forming, using, and removing a mandrel to manufacture a complex monolithic composite part.

2. Related Art

Hollow composite parts are often used in the manufacture of aircrafts. A hollow composite part is typically formed using layers or plies of composite material wrapped around a mandrel having a desired shape of the hollow composite part. The composite material is then sealed within an external impermeable membrane which is compressed by removal of air in the external impermeable membrane to consolidate the composite materials. However, this compression pressure applied on the outer surfaces of the composite part does not consistently provide proper consolidation of the composite materials.

After sealing, the composite material is hardened through a curing process, after which the external impermeable membrane is removed and the mandrel is removed from within the resulting composite part. Some prior art mandrels of basic geometry slightly shrink following the curing process to allow the mandrel to be removed from within the hollow composite part. However, these shrinking mandrels can not be used within a hollow complex monolithic composite part, such as a composite part with a hollow grid shape or complex contours, because the mandrels become trapped within the composite part.

Other prior art methods of removing the mandrels use foam mandrels in the manufacture of hollow composite parts and remove the mandrel with a method called glass bead blasting. Glass bead blasting involves shooting a plurality of glass beads at high speeds into one end of the foam mandrel with a blasting apparatus that travels from one end of the foam mandrel to the other, breaking the mandrel into smaller fragments. The fragments of the foam mandrel are then suctioned out or otherwise removed from the hollow composite part. However, the impact of the glass beads during mandrel removal can damage the inner surfaces of the hollow composite part.

Accordingly, there is a need for an improved method of forming hollow composite parts that overcomes the limitations of the prior art.

SUMMARY

Embodiments of the present invention solve the above-mentioned problems and provide a distinct advance in the art of manufacturing complex hollow composite parts. A method of forming a composite part may comprise the steps of forming a mandrel having a hollow tunnel formed therein, and placing a protective membrane against an outer surface of the mandrel. Forming the mandrel may comprise placing a protective membrane against an inner surface of a hollow fabrication tooling, placing a tube insert inside the fabrication tooling, then filling space between the tube insert and the protective membrane with a formable media. The formable media may then be solidified to form the mandrel, and the fabrication tooling and the tube insert may be removed from the protective membrane and the mandrel.

The method may further comprise placing composite material around the protective membrane then inserting one or more tube-like internal impermeable membranes into the mandrel's tunnel and sealing ends of the internal impermeable membranes to an external impermeable membrane placed outward of and surrounding the composite material. Air may then be removed from between the internal and external impermeable membranes, compressing the mandrel toward the composite material and the composite material toward the mandrel. The compressed composite material may then be cured and debagged to form the composite part. Finally, the mandrel may be broken up into smaller pieces and removed from within the composite part, followed by removal of the protective membrane from within the hollow composite part.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a perspective view of a fuselage door surround frame constructed in accordance with an embodiment of the invention;

FIG. 2 is a perspective view of a c-channel body frame constructed in accordance with an embodiment of the invention;

FIG. 3 is a perspective view of a crew window frame constructed in accordance with an embodiment of the invention;

FIG. 4 is a perspective view of another crew window frame constructed in accordance with an embodiment of the invention;

FIG. 5 is a perspective view of a nacelle torque box constructed in accordance with an embodiment of the invention;

FIG. 6 is an exploded fragmentary perspective view of a fabrication tool used in the construction of a composite part, such as those illustrated in FIGS. 1-5, according to an embodiment of the invention;

FIG. 7 is a perspective view of an end plate of the fabrication tooling of FIG. 6;

FIG. 8 is an elevation view of part of the fabrication tool of FIG. 6 with composite material laid thereon;

FIG. 9 is an elevation view of a top cap of the fabrication tool of FIG. 6 as a protective membrane is being sprayed thereon;

FIG. 18 is a perspective view of the protective membrane and the mandrel formed by the fabrication tooling of FIG. 6;

FIG. 19 is a fragmentary perspective view of the mandrel of FIG. 18;

FIG. 20 is a perspective view of a portion of the protective membrane, illustrating cut lines for segmenting the protective membrane;

FIG. 21 is a fragmentary side elevation view of two segments of the protective membrane, illustrating a step cut pattern therebetween;

FIG. 22 is a fragmentary side elevation view of two segments of the protective membrane, illustrating a diagonal cut pattern therebetween;

Figure 10:
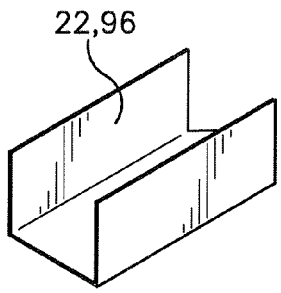
FIG. 10 is a perspective view of a protective membrane shaped to fit onto the composite material illustrated in FIG. 7.

The drawing figures do not limit the present invention to the specific embodiment disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In accordance with various embodiments of the present invention, FIGS. 1-5 illustrate examples of complex monolithic hollow composite parts 10 which may be formed using the systems and methods described herein. Each hollow composite part 10 may be one continuous hollow structure with complex contours and/or intersecting segments and may comprise outer surfaces 12 and inner surfaces 14. Each composite part 10 may have varying cross sectional shapes and sizes and may be shaped in the form of a hollow lattice, a hollow grid, or a hollow crossed-beam pattern, such as a hollow I-beam, T-beam, L-beam, or any other pattern having crossing or intersecting beams. Furthermore, each composite part 10 may have any hollow, monolithic, complex shapes of trapped geometry. Specifically, the phrase "trapped geometry" as used herein refers to the composite part 10 "trapping" a monolithic mandrel 30 therein, as described below, such that the mandrel 30 can not be removed without breaking up the mandrel 30 into smaller pieces and/or cutting apart the monolithic composite part 10.

For example, the composite part 10 may be a fuselage door surround frame, as illustrated in FIG. 1; a left or right-hand c-channel body frame, as illustrated in FIG. 2; a crew window frame, as in FIG. 3 or FIG. 4; and/or a nacelle torque box as illustrated in FIG. 5.

Figure 24:
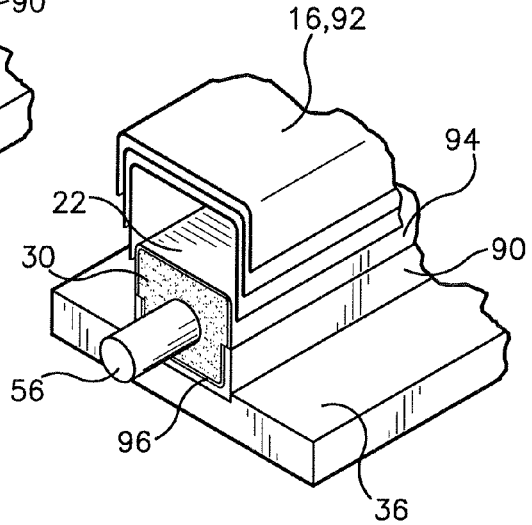
FIG. 24 is a fragmentary perspective view of the mandrel of FIG. 23 illustrating composite material being placed thereon to form the upper portion of the composite part.

The composite part 10 may be formed of composite material 16 (as illustrated in FIGS. 8 and 24), such as composite plies layered on top of each other. For example, the composite material 16 may be any high or low temperature thermoset composites matrix, such as pre-preg tow, resin infusion, resin transfer molding (RTM), resin film infusion (RFI), wet lay-up, and the like. The composite plies may have any thickness, height, and width, and may have any fiber orientations as required for a particular composite part. For example, a cured composite ply may have a thickness of between 0.001 inches and 0.01 inches. In some embodiments of the invention, the composite part 10 may have a ply thickness ranging from 10 plies to 150 plies. For example, the composite part 10 may have a ply thickness ranging from 21 plies to 135 plies to form a part thickness between 0.158 inches to 1.013 inches.

Each composite part 10 may be formed using a system comprising any of the elements illustrated in FIGS. 6-34. Specifically, the system may comprise fabrication tooling 20 for forming the outer surfaces 12 of the composite part 10, one or more protective membranes 22 for protecting the inner surfaces 14 of the composite part 10, inserts 24 positioned inward of the protective membranes 22, one or more impermeable membranes 26 for consolidating the composite material 16, and the mandrel 30, which may be formed between the protective membranes 22 and the inserts 24. The system may also comprise a vacuuming apparatus (not shown) for removing air from within the impermeable membrane 26 and a mandrel removal apparatus (not shown) for breaking up the mandrel 30 for removal from within the hollow composite part 10.

The fabrication tooling 20, illustrated in FIGS. 6 and 7, may be formed of any rigid material substantially resistant to high levels of heat, such as those used in a composite curing process. For example, the tooling 20 may be formed of aluminum, steel, invar, composites (e.g., epoxy graphite, bismaleimides, fiberglass, and the like), and/or any equivalents or combinations thereof. The fabrication tooling 20 may comprise a tool base 36, one or more fairing bars 38 removably attachable to the tool base 36, a tool cap 40 removably attachable to the tool base 36 and/or the fairing bars 38, and at least one tool end plate 42,44 removably attachable to the tool base 36, the fairing bars 38, and/or the tool cap 40. When attached together, the elements of the fabrication tooling 20 may form a substantially enclosed hollow area into which a formable media may be inserted to form the mandrel 30, as later described herein.

The tool base 36 may have a surface 46 for supporting at least one side of the composite part 10 and/or the mandrel 30. The surface 46 may comprise a cavity 48 formed therein configured to substantially match the size and shape of at least a portion of the outer surfaces 12 of the composite part 10.

The fairing bars 38 may also be configured to substantially match the size and shape of at least a portion of the outer surfaces 12 of the composite part 10. The fairing bars 38 may attach to the tool base surface 46 at or proximate to boundary edges of the cavity 48.

The tool cap 40 may be configured to substantially match the size and shape of at least a portion of the outer surfaces 12 of the composite part 10. The tool cap 40 may attach to the fairing bars 38 opposite of the tool base 36, as illustrated in FIG. 6. Alternatively, the tool cap 40 may be configured to attach directly to the tool base surface 46 at or proximate to the boundary edges of the cavity 48.

The tool end plates 42,44, illustrated in FIGS. 6 and 7, may be used to close off open ends formed by the tool base 36, the fairing bars 38, and/or the tool cap 40. The tool end plates 42,44 may have a plurality of ports formed therein, such as an injection port 50, a vent port 52, and/or an insert relief hole 54. The ports 50,52 may comprise or be bounded by threads 56 or other attachment elements for attaching various inputs thereto, such as a hose operable to attach to the injection port 50 for dispensing the formable media into the hollow space within the assembled fabrication tooling 20. The vent port 52 may be configured to allow volatiles, such as outgas to exit the space within the assembled fabrication tooling 20, reducing or eliminating porosity or trapped gas pockets in the mandrel 30. Furthermore, the vent port 52 may have flex tubing (not shown) attached thereto for aiding volatiles outgas to escape from the formable media. The insert relief hole 54 may be formed in one or more of the tool end plates 42,44 to allow one of the inserts 24 to extend therethrough, as described below. However, the end plates 42,44 do not necessarily form or comprise the ports 50-54 described above. In some embodiments of the invention, one or more of the end plates 42,44 include one or more of the ports 50-54, while others of the end plates 42,44 of the fabrication tooling 20 may not include any of the ports 50-54.

The quantity of tool end plates 42,44 may depend upon the shape of the composite part 10. For example, the fuselage door surround frame illustrated in FIG. 1 has a grid-like hollow configuration with eight open ends. Therefore, the assembled fabrication tooling 20 used to form the fuselage door surround frame of FIG. 1 would require eight end plates 42,44.

Figure 11:
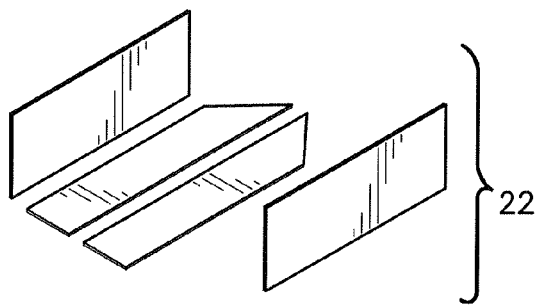
FIG. 11 is a perspective view of the protective membrane of FIG. 10 divided into a plurality of segments.
Figure 12:
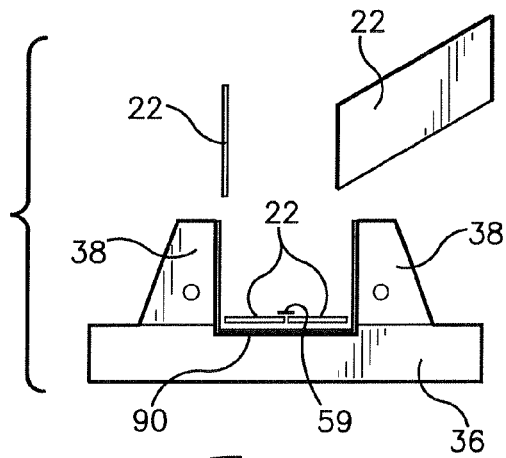
FIG. 12 is an elevation view of the fabrication tooling of FIG. 7 illustrating the segments of the protective membrane of FIG. 10 being applied onto the composite material.
Figure 13:
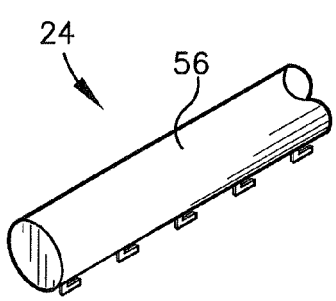
FIG. 13 is a fragmentary perspective view of a tube insert for placement within the fabrication tooling of FIG. 6.

The protective membrane 22, illustrated in FIGS. 9-12, FIG. 18, and FIG. 20, may be formed out of insulating, substantially impact-resistant material. For example, the protective membrane 22 may be made of metal foils, TEDLAR films, nylon films, FEB films, poly urea, urethanes, polymeric polyols, cured silicone sheeting, TEFLON film or sheeting, and/or hybrids or combinations thereof. The protective membrane 22 may be formed by spraying or rolling a protective membrane material onto a mold (not shown) and/or a portion of the fabrication tooling 20 and then curing or setting the material thereon to harden in the shape of the mold and/or a portion of the fabrication tooling 20. For example, poly urea may be sprayed in liquid form onto an inner surface of the tool cap 40, as illustrated in FIG. 9, and then allowed to harden thereon. In some embodiments of the invention, the protective membrane 22 may be segmented into a plurality of pieces, as illustrated in FIG. 11 and later described herein, for purposes such as removal, spot or zone compaction, and/or inner mold line (IML) surface control. The thickness, shape, and segmentation of the protective membrane 22 may vary depending on the shape, size, and type of the composite part 10 being formed.

In some embodiments of the invention, the protective membrane 22 may be reinforced for increased tension loads during extraction following removal of the mandrel 30. For example, a continuous length of high tensile strength reinforcement material (not shown) may be placed on or in one or more segments of the protective membrane 22 along an axial extraction pull load path. High-strength tapes, wires, cords, cables, and the like may be used. Gripping of both the protective membrane 22 and the reinforcement material may be required during extraction from the composite part 10. Additionally, segments of the protective membrane 22 may be joined by flexible attached reinforcement strand media (not shown) to aid in pulling the segmented pieces around or through restrictive contours during extraction from the composite part 10.

The inserts 24, illustrated in FIGS. 13-16 and FIG. 27, may comprise tube inserts 56 and/or spacer blocks 58 and may be positioned inward of the protective membrane 22 within the hollow area of the fabrication tooling 20. In various embodiments of the invention, an adhesive 59, such as a thin Teflon tape, may attach the tube inserts 56 and/or the spacer blocks 58 to the protective membrane 22.

The tube inserts 56 may be one or more elongated hollow or solid inserts having any cross-sectional shape, such as circular, square, triangular, radiused-corner rectangular, or screw spirals (e.g. left-hand course rifling or thread). The tube inserts 56 may be rigid enough that they do not collapse under the weight or pressure of the formable media and may be made of, for example, SILASTIC J cured silicone rubber or the like. Variable lengths and diameters of cured silicon rubber shapes, rigid or flexible metal and plastic coils, positive spiral land doweling, tubing or hose, and the like may be stretched, rotated, melted, broken, or washed out to remove the tube inserts 56 from the mandrel 30 once the formable media is hardened. At least a portion of the tube inserts 56 may extend outward of the fabrication tooling 20 via the insert relief hole 54, allowing the tube inserts 56 to be pulled out from the mandrel 30, as described herein.

In some embodiments of the invention, multiple tube inserts 56 may be used when forming a complex composite part, such as the hollow grid-like composite part illustrated in FIG. 1. The multiple tube inserts 56 may vary in length to suite the part. Furthermore, one or more of the multiple tube inserts 56 may have a slight taper toward an interior end to improve extraction through extreme compound contours.

Figure 29:
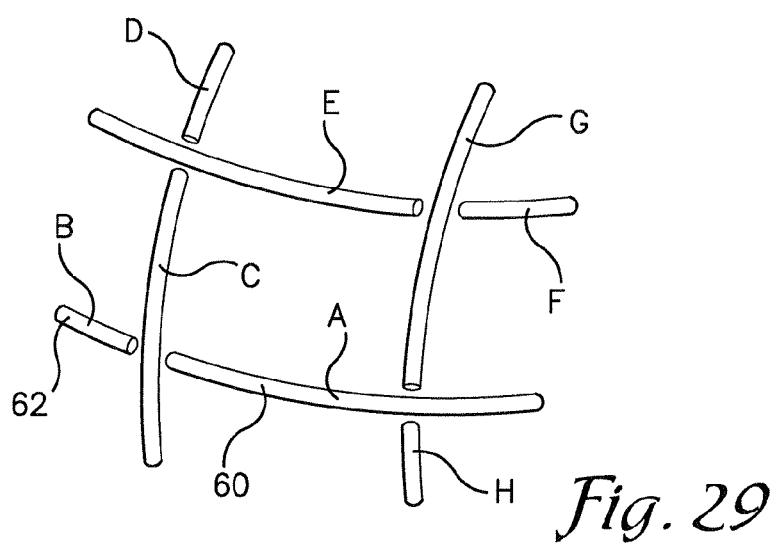
FIG. 29 is a perspective view of a plurality of tube inserts to be used in forming a mandrel for a hollow grid-shaped composite part.
Figure 30:
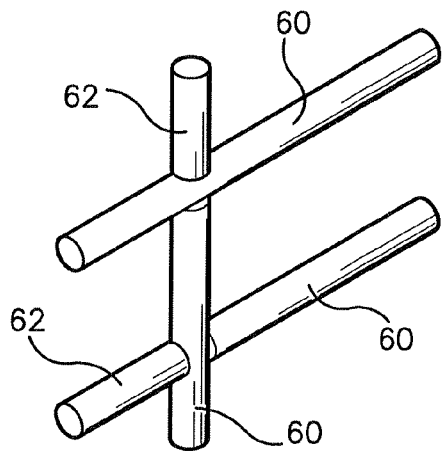
FIG. 30 is a perspective view of a portion of the tube inserts of FIG. 29.
Figure 31:
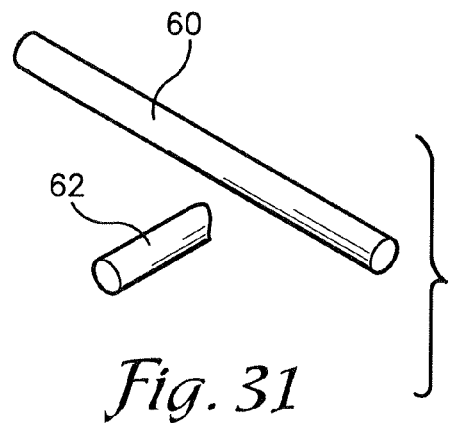
FIG. 31 is an exploded perspective view of two of the tube inserts of FIG. 29, illustrating that an end of one of the tube inserts is shaped to rest flush against a side wall of another of the tube inserts.

For example, as illustrated in FIGS. 29-31, the tube inserts 56 may comprise long inserts 60 and short inserts 62. At least one end of each of the long and short inserts 60,62 may be configured to match a contour of an outer surface of another one of the long or short inserts 60 within an intersection area of the grid to be formed. For example, as illustrated in FIG. 29, one end of a first long insert A and one end of a first short insert B may abut an outer surface of a second long insert C, one end of the second long insert C and one end of a second short insert D may abut an outer surface of a third long insert E, one end of the third long insert E and one end of a third short insert F may abut an outer surface of a fourth long insert G, and one end of the fourth long insert G and one end of a fourth short insert H may abut the first long insert A. Additionally, in some embodiments of the invention, inserts may be substantially perpendicular to the inserts which they abut. For example, inserts A and B may be substantially perpendicular to insert C.

Figure 28:
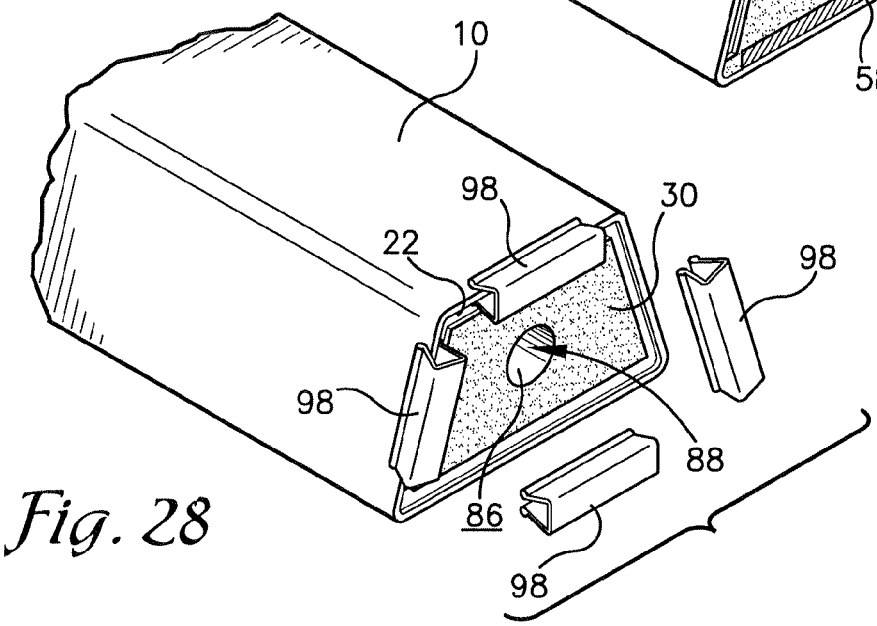
FIG. 28 is a fragmentary perspective view of the composite part after cure, illustrating clipping the composite part to the protective membrane.

In various embodiments of the invention, one or more of the spacer blocks 58 may be attached to or integral with one or more of the tube inserts 56 to properly space the tube inserts 56 within the fabrication tool 20 relative to the protective membrane 22. Additional spacer blocks 58 may be positioned inward of the protective membrane 22 proximate ends thereof and adjacent the end plates 42,44. The spacer blocks 58 may be made of cured silicon or TEFLON square section strips and may be taped to the protective membrane 22. The spacer blocks 58 may fill an amount of space within the fabrication tooling 20 such that that space is not filled with the formable media. The spacer blocks 58 may therefore provide space within the mandrel 30 for clips 98 (as illustrated in FIG. 28) to clamp the protective membrane 22 to the composite part 10 during removal of the mandrel 30, as later described herein.

The impermeable membrane 26 may be made of any substantially malleable material such as plastic or any type of vacuum bagging material used in curing composite parts. For example, nylon and/or FEP may be used for at least part of the impermeable membrane 26. The impermeable membrane 26 may be one tailored, continuous bag completely encompassing the composite material and extending through tunnels of the mandrel 30, as late described herein. The impermeable membrane 26 may additionally or alternatively comprise one or more external impermeable membrane 64 and/or one or more internal impermeable membrane 66, as illustrated in FIGS. 25-26 and FIGS. 32-34, which may be integral and/or sealed to each other in an airtight manner.

The external impermeable membrane 64 may have an inward facing surface 68 and an outward facing surface 70 and may be placed over the composite material 16 and sealed to the tool base 36. Additionally or alternatively, the external impermeable membrane 64 may comprise one or more sheets of impermeable membrane material which may completely surround the outer surfaces 12 of the composite part 10 and be sealed together forming a boundary substantially surrounding the composite part 10. For example, the external impermeable membrane 64 may form a sealed airtight envelope around the outer surfaces 12 of the composite part 10. The external impermeable membrane 64 may also comprise a vacuum port (not shown) for attachment of a vacuum to suction air out of a space between the sheets of the external impermeable membrane 64.

Figure 26:
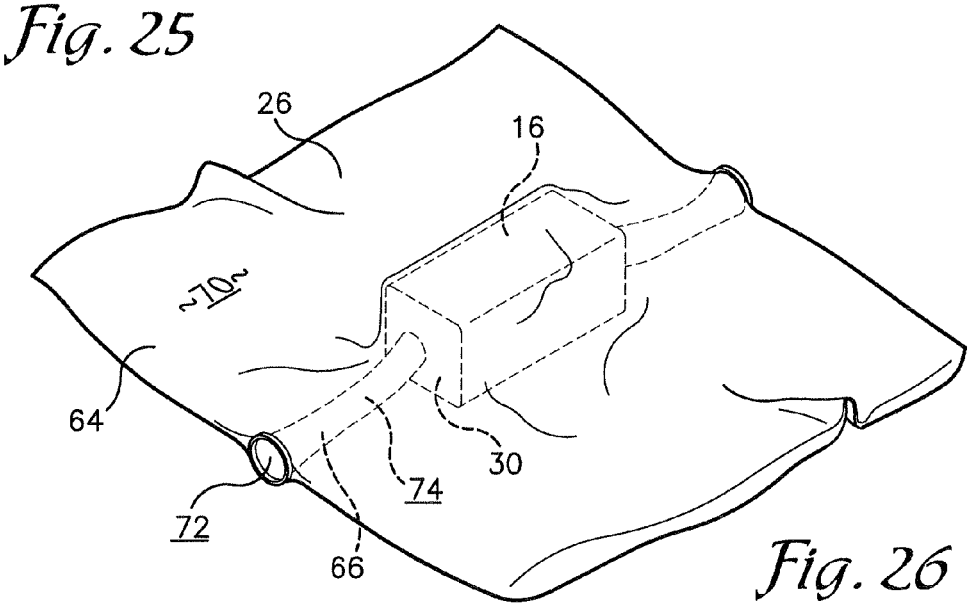
FIG. 26 is a perspective view of the external impermeable membrane sealed around the composite material and the mandrel of FIG. 24 without the tool base.

The internal impermeable membrane 66 may have an inward facing surface 72 and an outward facing surface 74 and may be configured to be placed within the mandrel 30 in a hollow space left by removal of the tube insert(s) 56. The internal membrane may additionally extend outward from the mandrel 30 at ends thereof. The internal impermeable membrane 66 may be one or more sheets of membrane material forming a tube, an envelope, or the like. For example, the internal impermeable membrane 66 may be one or more hollow tube bags. One or more end portions of the internal impermeable membrane 66 may be sealed to the external impermeable membrane 64 such that the inward facing surface 72 of the internal impermeable membrane 66 is open to ambient air from one or more open ends. So, for example, as illustrated in FIG. 26, the internal impermeable membrane 64 may serve as a tunnel extending within the external impermeable membrane 64 and the mandrel 30. In this configuration, when air is removed from within the external impermeable membrane 64 it may be compressed in a generally inward direction toward the composite material 16 and the mandrel 30, with its outward facing surface 70 pressing against the composite material 16. Simultaneously, the internal impermeable membrane 66 may compress against the mandrel 30 from the inside in a generally outward direction such that its outward facing surface 74 presses against the mandrel 30.

Figure 32:
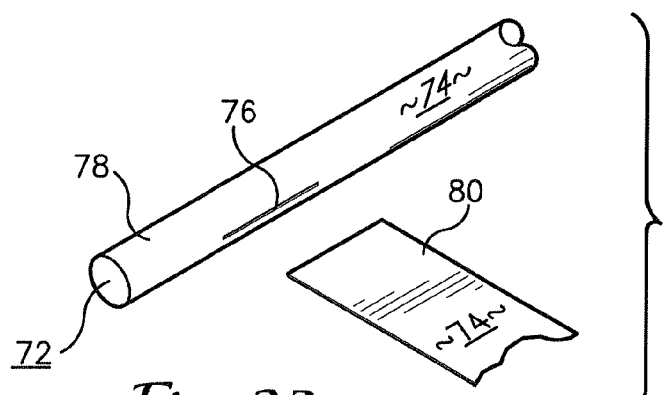
FIG. 32 is an exploded fragmentary perspective view of two internal impermeable membranes configured to be placed inside tunnels of the mandrel.
Figure 33:
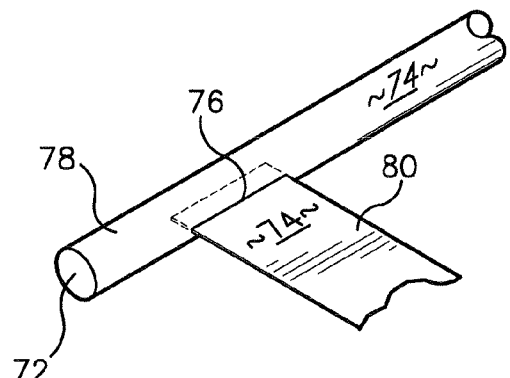
FIG. 33 is a fragmentary perspective view of the internal impermeable membranes of FIG. 32, with one internal impermeable membrane slid into a slit of the other internal impermeable membrane.
Figure 34:
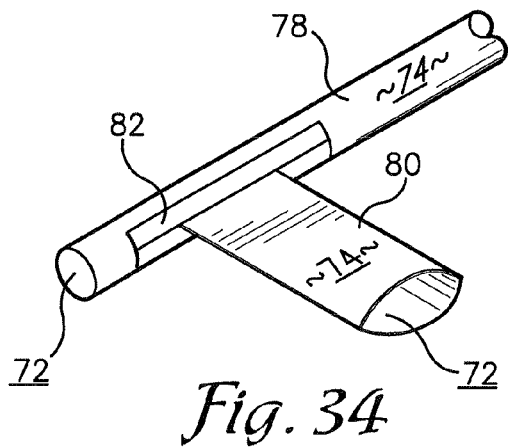
FIG. 34 is a fragmentary perspective view of the internal impermeable membranes of FIG. 33, with adhesive added to seal the outer surfaces of the internal impermeable membranes together.

In some embodiments of the invention, such as the hollow grid-shaped composite parts illustrated in FIGS. 1 and 3-4, the internal impermeable membrane 66 may be configured to form a series of tubes or envelopes open at each end, forming a hollow grid-shaped internal impermeable membrane 66. For example, as illustrated in FIGS. 32-34, a slit 76 may be formed into a first tube 78 of the internal impermeable membrane 66 such that a second tube 80 of the internal impermeable membrane 66 may be slid into the slit 76 and sealed thereto, such as by sealing tape 82 or mud. However, various methods may be employed for forming a variety of shapes and configurations of hollow internal impermeable membranes 66 having open ends extending outward from the mandrel 30.

The mandrel 30, as illustrated in FIGS. 18-19 and FIGS. 23-28, may be made out of the formable media, as mentioned above. The formable media may be any material capable of conforming to a shape of a container or mold and then hardening to retain the shape of the container or mold once it is removed. For example, the formable media may be urethane, ceramic, carbon-carbon, coal-carbon, GRAFOAM carbon foam, ROHACELL, various types of liquid-reacting expanding foam filler, and the like. Furthermore, the formable media may include borosilicate glass, injectable expanding polyurethane foam of tailored densities, thermally transitive materials, eutectic salts, SILASTIC J cured silicones, differential CTE metals, composites, AQUACORE, AQUACORE Premium, FASTCORE, and the like. The formable media may be configured to be set, cured or otherwise solidified into a hardened state to form the rigid or semi-rigid mandrel 30.

The mandrel 30 may be formed into any shape. For example, the mandrel 30 may be a monolithic complex shape of trapped geometry, such that when the composite part 10 is formed and cured on the mandrel 30, the mandrel 30 is trapped therein and may only be removed by breaking or dividing the mandrel into smaller pieces, as later described herein. In some embodiments of the invention, at least a portion of the mandrel may be shaped as a monolithic lattice, grid, crossed-beam configuration, and/or complex contoured shape.

The mandrel 30 may have an outer surface 84 adjacent to the protective membrane 22 and an inner surface 86 forming boundaries of one or more tunnels 88 formed through the mandrel 30, as illustrated in FIG. 19. The tunnels 88 may be formed by the tube inserts 56 and may extend from at least one end of the mandrel 30 to another end thereof. In some embodiments of the invention, the mandrel 30 may have a plurality of ends with the tunnels 88 extending to each of the ends. The tunnels 88 may have any cross-sectional shape and may be configured such that the internal impermeable membrane 66 may be inserted therein and/or therethrough.

The vacuuming apparatus (not shown) may be any device operable to suction air from within the impermeable membrane 26 and/or from between the external impermeable membrane 64 and the internal impermeable membrane 66 for consolidating the composite material 16 against the mandrel 30.

The mandrel removal apparatus (not shown) may be any device configured for removing the mandrel 30 from the composite part 10. Specifically, the mandrel removal apparatus may be operable to fragment the mandrel 30 within the composite part 10 by media blast, thermal shock, mechanical shock, or differential positive air pressure. For example, the mandrel removal apparatus may blast glass or plastic beads at high speeds into the mandrel 30 and/or suction the beads and broken up particles of the mandrel out of the composite part 10. However, any blast media of sufficient mass to affect the mandrel material will suffice, whether that is plastic, ice, metal alloy, glass, etc. As mentioned above, after the composite part 10 is hardened around the mandrel 30, the mandrel 30 is trapped therein and can not be removed without breaking up the mandrel 30 into smaller pieces, such as by way of the mandrel removal apparatus.

The above-described system 18 may be used in a method of forming a hollow monolithic composite part. For example, a method of the present invention may broadly comprise placing composite material 16 around at least a portion of the outer surface 84 of the mandrel 30, then placing the internal impermeable membrane 66 into and/or through the tunnels 88 of the mandrel 30. Next, the external impermeable membrane 64 may be placed around and outward of at least a portion of the composite material 16 and then sealed against itself and sealed to the internal impermeable membrane 66 such that the mandrel 30 and the composite material 16 are both contained in an airtight manner between the internal impermeable membrane 66 and the external impermeable membrane 64. Air may then be removed from within the sealed impermeable membrane 26, compressing the impermeable membrane 26 against the mandrel 30 and/or the composite material 16. The impermeable membrane 26 along with the consolidated composite material 16 and mandrel 30 may be cured, such as by placing the combination into an autoclave to be heated and then subsequently removed and cooled, thereby hardening the composite material 16 into the composite part 10. Finally, the impermeable membrane 26 may be removed, followed by removal of the mandrel 30 by breaking it up into smaller pieces.

Figure 35:
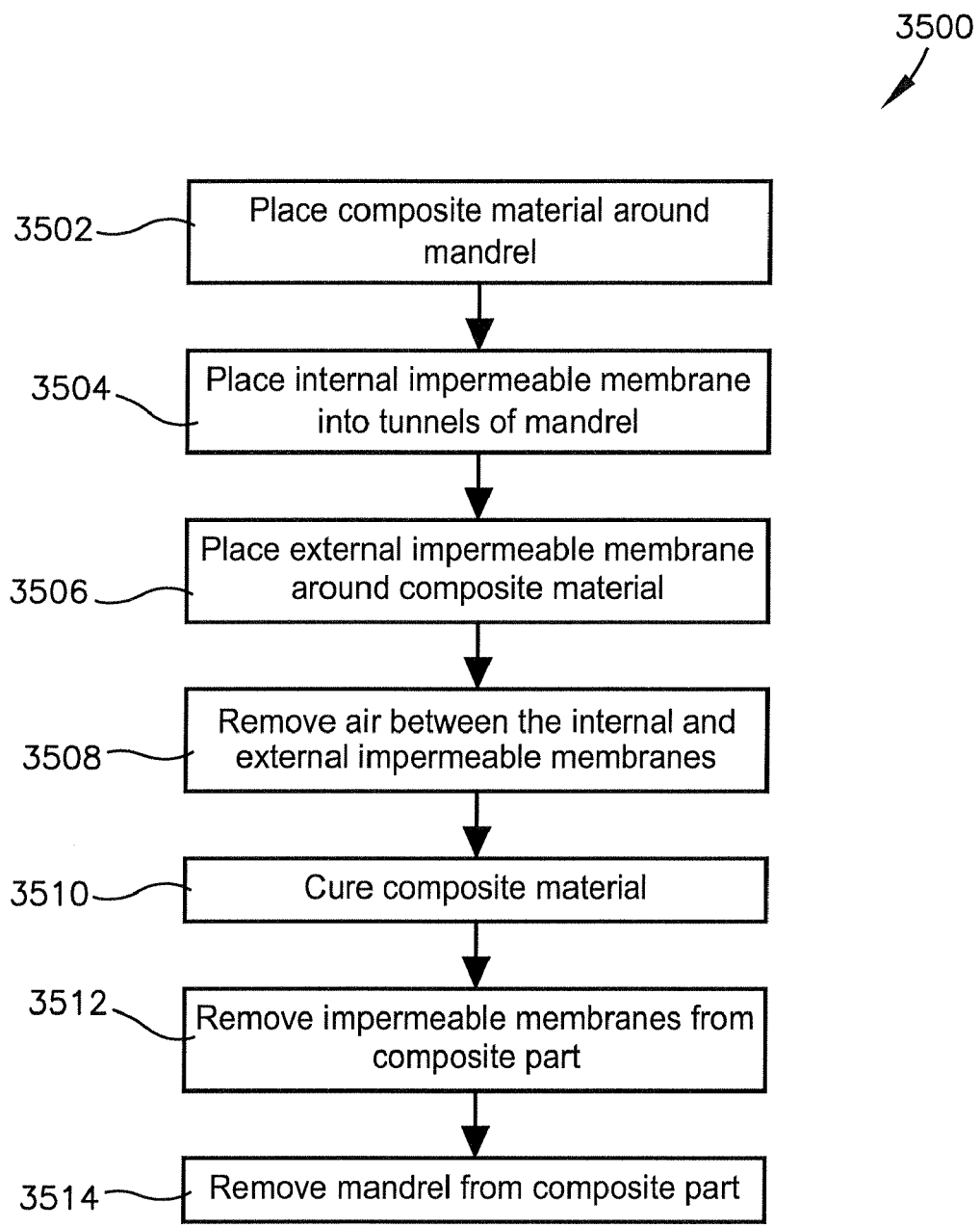
FIG. 35 is a flow chart of a method of forming a composite part according to an embodiment of the invention.

The flow chart of FIG. 35 depicts the steps of an exemplary method 3500 of the invention in more detail. In some alternative implementations, the functions noted in the various blocks may occur out of the order depicted in FIG. 35. For example, two blocks shown in succession in FIG. 35 may in fact be executed substantially concurrently, or the blocks may sometimes be executed in the reverse order depending upon the functionality involved.

As illustrated in FIG. 35, the method 3500 may comprise placing composite material 16 around at least a portion of the outer surface 84 of the mandrel 30, as depicted in step 3502. The composite material 16 may be applied by hand, one layer or ply at a time, and/or by various fiber placement methods. Furthermore, a portion of the composite material 16 may already be cured and hardened prior to placement against the mandrel 30, as later described herein.

As depicted in step 3504, the internal impermeable membrane 66 may then be placed into and/or through the tunnels 88 of the mandrel 30. For example, various rods or wires may be used to thread the internal impermeable membrane 66 into the tunnels 88 and/or the internal impermeable membrane 66 may be placed around the tube inserts 56 prior to forming the mandrel 30 such that when the tube inserts 56 are removed, the internal impermeable membrane 66 remains. For mandrels with intersecting tunnels 88, the rods or wires may guide the internal impermeable membrane 66 over or under other portions of the internal impermeable membrane 66. In some embodiments of the invention, a release film may be applied to the inner surface 86 of the mandrel 30 and/or to the internal impermeable membrane 66 to prevent it from sticking to the mandrel 30 during cure, so that the internal impermeable membrane 66 may simply be pulled out from the mandrel 30 after cure.

Next, as depicted in step 3506 the external impermeable membrane 64 may be placed around and outward of at least a portion of the composite material 16 and then sealed against itself and sealed to the internal impermeable membrane 66. In this configuration, the mandrel 30 and the composite material 16 may be sealed within in an airtight pocket formed between the internal impermeable membrane 66 and the external impermeable membrane 64. At least part of the inward facing surface 72 of the internal impermeable membrane 66 may be open to ambient air. At least a portion of the outward facing surface 74 of the internal impermeable membrane 66 may face, contact, and/or be adjacent to the inner surface 86 of the mandrel 30. Thus, the impermeable membrane 26 may fully encapsulate the composite material 16.

For example, internal impermeable membrane 66 may be cylindrical with ends or edges thereof sealed to ends or edges of the external impermeable membrane 64, then the remaining edges or ends of the external impermeable membrane 64 may be sealed to each other, such that the impermeable membrane 26 forms a sealed air pocket having one or more tunnels formed therethrough. The air pocket may be outward of the internal impermeable membrane 66, with ambient air located inward of the internal impermeable membrane 66. In some embodiments of the invention, at least a portion of the internal impermeable membrane 66 may be formed integral with the external impermeable membrane 64.

Air may then be removed from within the sealed impermeable membrane 26, compressing the impermeable membrane 26 against the mandrel 30 and/or the composite material 16, as depicted in step 3508. For example, air from within the air pocket described above between the internal impermeable membrane 66 and the external impermeable membrane 64 may be suctioned out via vacuum compressing the entire impermeable membrane 26. Compression of the impermeable membrane 26 may compress the composite material 16 and the mandrel 30 toward each other. For example, during vacuum of air out from within the impermeable membrane 26, at least a portion of the outward facing surface 74 of the internal impermeable membrane 66 may press outward toward and against the inner surface 86 of the mandrel 30 while the inward facing surface 68 of the external impermeable membrane 64 may press against at least a portion of the outer surface 12 of the composite part 10.

As depicted in step 3510, the impermeable membrane 26 along with the consolidated composite material 16 and mandrel 30 may be cured, using autoclave or non-autoclave methods. For example, the impermeable membrane 26, composite material 16, and mandrel 30 may be placed into an autoclave to be heated and then subsequently removed and cooled, thereby hardening the composite material 16 to form the composite part 10. Various cure processes requiring various temperatures, heating times, and cooling times may be used depending on the dimensions, configuration, thickness, and composition of material for the composite part 10.

The impermeable membrane 26 may be removed, as depicted in step 3512, followed by removal of the mandrel 30, as depicted in step 3514. For example, a user may simply tear and/or pull the impermeable membrane 26 off of the composite part 10 and out of the mandrel 30. The mandrel 30 may then be removed by any means, such as breaking the mandrel up into smaller pieces using methods such as blasting the mandrel 30 with plastic or glass beads and then sucking or otherwise emptying the beads and chunks or particles of the mandrel 30. Other methods of breaking the mandrel 30 into smaller chunks or particles for removal from the composite part 10 may comprise thermal shock or differential positive air pressure.

In another embodiment of the invention, a method 3600 may include the steps of method 3500 described above and may further comprise pre-curing a first portion of the composite part 10 in the fabrication tooling 20, forming the mandrel 30, and forming and placing the protective membrane 22 outward of and against the mandrel 30 prior to placing composite material around the mandrel 30.

Figure 36:
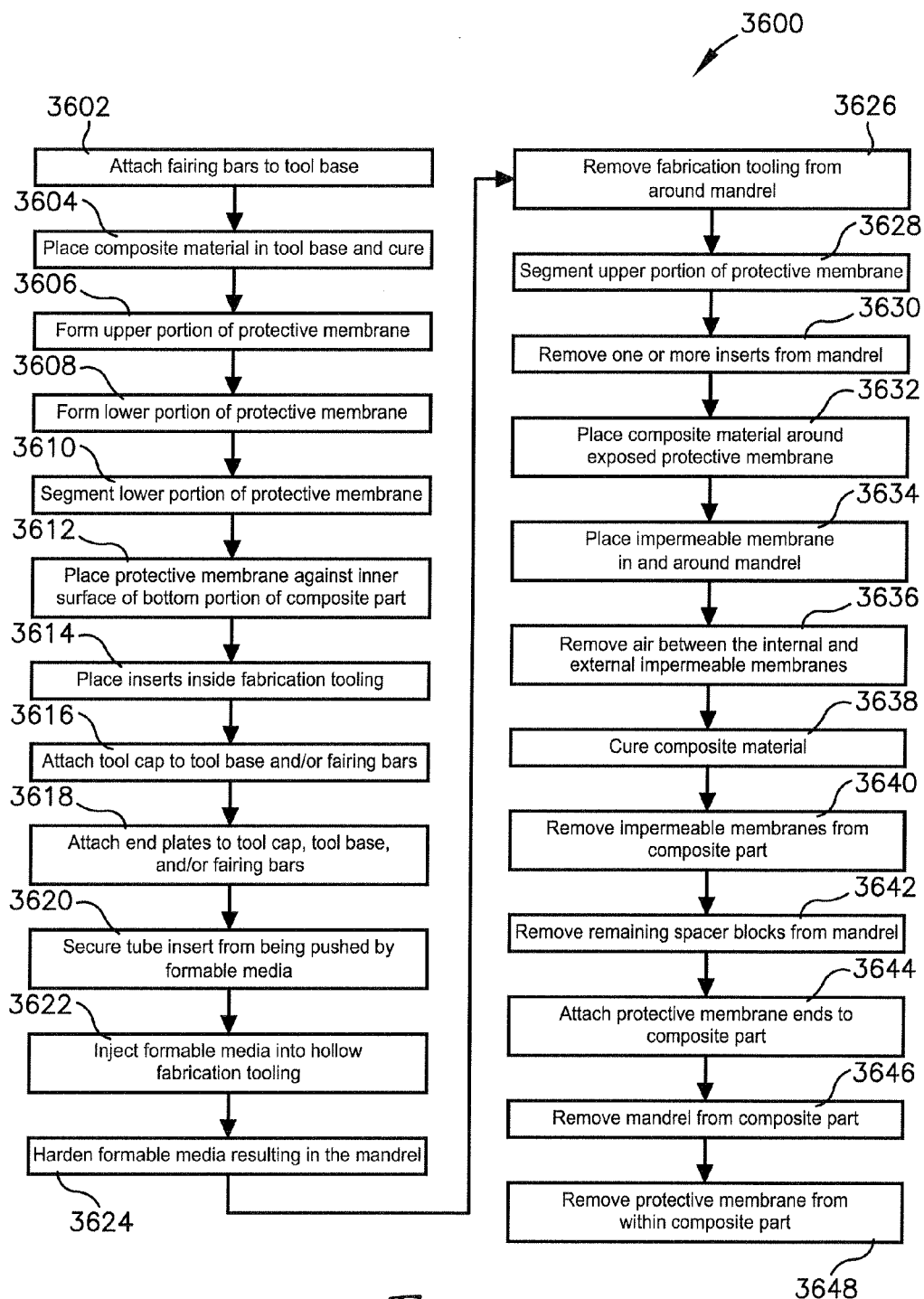
FIG. 36 is a flow chart of a method of forming a mandrel and forming a composite part using the mandrel according to an embodiment of the invention.

The flow chart of FIG. 36 depicts the steps of the exemplary method 3600 of the invention in more detail. In some alternative implementations, the functions noted in the various blocks may occur out of the order depicted in FIG. 36. For example, two blocks shown in succession in FIG. 36 may in fact be executed substantially concurrently, or the blocks may sometimes be executed in the reverse order depending upon the functionality involved.

As illustrated in FIG. 36, the method 3600 may comprise attaching the fairing bars 38 to the tool base 36, as depicted in step 3602. However, in some embodiments of the invention, the fairing bars 38 may not be required and/or may be integral with the tool base 36. The fairing bars 38 may form side walls of the composite part 10.

The composite material 16 may then be placed onto the tool base 36 and/or the fairing bars 38 and hardened into a first or bottom portion 90 of the composite part 10, as depicted in step 3604. Specifically, plies of the composite material may be placed against inner surfaces of the tool base 36 and/or the fairing bars 38. The impermeable membrane 26 may be placed over the composite material 16 and sealed to the tool base 36 and/or faring bars 38 then compressed against the composite material 16 by vacuum remove of air between the impermeable membrane 26 and the tool base 36 and/or the fairing bars 38. The tool base 36 and/or fairing bars 38, the impermeable membrane 26, and the compressed composite material 16 may then be cured, such as by placing this combination of elements into an autoclave to be heated and subsequently cooled for a given length of time. After the bottom portion 90 of the composite part 10 is hardened, the impermeable membrane 26 may be removed therefrom. Note that in some embodiments of the invention, the first or bottom portion 90 of the composite part 10 is not formed and cured separately, but is rather formed around the mandrel 30 and cure simultaneously with a second or upper portion 92 of the composite part 10.

As depicted in step 3606, the tool cap 40 may be covered with material for forming the protective membrane 22, thereby forming an upper portion 94 of the protective membrane 22. As described above, the protective membrane 22 may be sprayed in liquid form onto an inner surface of the tool cap 40, as illustrated in FIG. 9, and then allowed to harden thereon. A mold (not shown) may also be covered with material for forming the protective membrane 22 and hardened therein to form a lower portion 96 of the protective membrane 22, as depicted in step 3608 and illustrated in FIG. 10. The mold may have substantially the same size and shape as the inner surface 14 of the bottom portion 90 of the composite part 10. In some embodiments of the invention, all inner surfaces of the fabrication tooling 20 may be coved with the protective membrane 22 in a non-solid form and hardened therein.

As depicted in step 3610, the lower portion 96 of the protective membrane 22 may be segmented into a plurality of pieces or segments for ease of removal. For example, the lower portion 96 of the protective membrane 22 may be segmented and then placed against the inner surface 14 of the bottom portion 90 of the composite part 10, as depicted in step 3612 and illustrated in FIGS. 10-12. In some embodiments of the invention, the protective membrane 22 may be covered with thin TEFLON tape having at least one adhesive side. Furthermore, the segments of the protective membrane 22 may be attached to each other and/or the composite part 10 with thin TEFLON tape.

Figure 14:
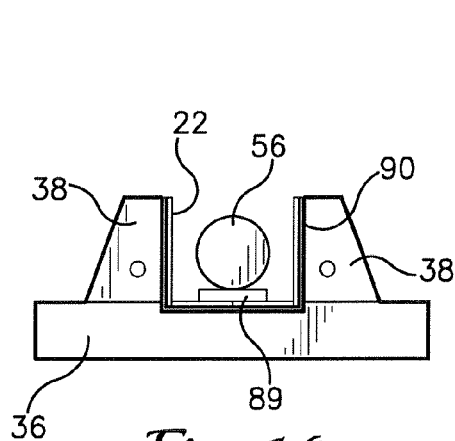
FIG. 14 is an elevation view of the fabrication tooling of FIG. 6 with the tube insert of FIG. 13 resting therein.
Figure 15:
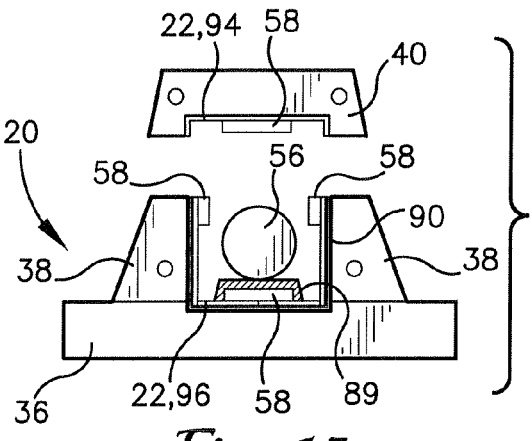
FIG. 15 is an exploded elevation view of the fabrication tooling of FIG. 6 illustrating the tool cap of FIG. 8 being attached with the other fabrication tooling pieces.
Figure 16:
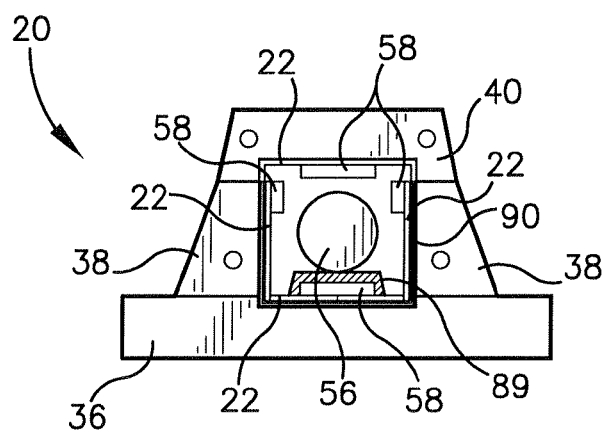
FIG. 16 is an elevation view of the fabrication tooling of FIG. 6 with composite material, the protective membrane, and the tube insert placed therein.

Next, the inserts 24 may be placed into and/or attached to the fabrication tooling 20, as depicted in step 3614. For example, the tube insert(s) 56 may be placed onto and/or inward of the protective membrane 22, as illustrated in FIGS. 14-16. The tube insert(s) 56 and/or a support spacer 89 connected thereto may be fixed to the protective membrane 22 via the TEFLON tape or any other method known in the art. Then other block inserts 58 may be attached to the protective membrane 22 proximate ends of the fabrication tooling 20, as depicted in FIGS. 15-16. For example, the block inserts 58 may be attached to the upper portion 94 of the protective membrane 22 and/or the lower portion 96 of the protective membrane 22.

Once the inserts 24 are secured to the protective membrane 22, the tool cap 40 may be attached to the tool base 36 and/or the fairing bars 38, as depicted in step 3616 and the end plates 42,44 may be attached to the tool base 36, the fairing bars 38, and/or the tool cap 40, as depicted in step 3618. Attachment of the components of the fabrication tooling 20 may be achieved using screws, bolts, or other mechanical fasteners.

Figure 17:
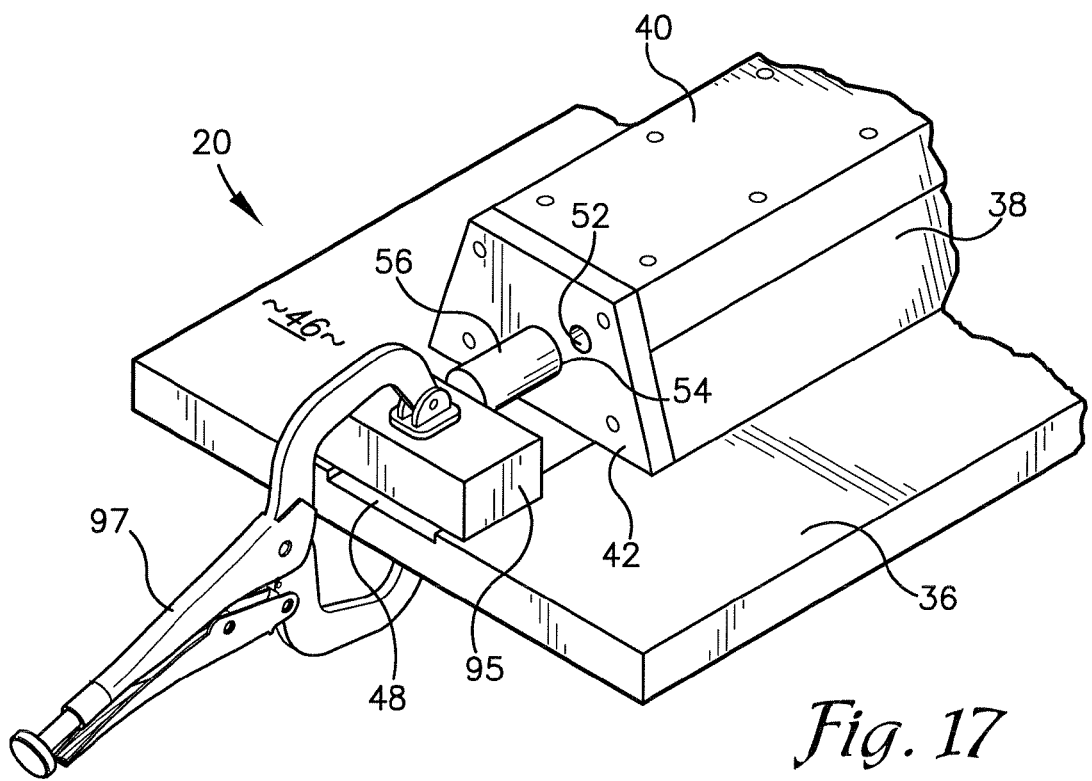
FIG. 17 is a fragmentary perspective view of the fabrication tooling of FIG. 6 and the tube insert of FIG. 13 configured for insertion of a formable media to form a mandrel.

As illustrated in FIG. 17, mechanical stops 95 and adjustable clamps 97 may be attached to the tool base 36 in a configuration to prevent the tube insert(s) 56 from being pushed out of the fabrication tooling 20 via the insert relief hole 54 by hydraulic force or expandable formable media during the injection step 3620. As depicted in step 3622, the formable media may be injected into the hollow fabrication tooling 20. The formable media may be injected in a flowable state such that it substantially fills the hollow area between the end plates 42,44, the protective membrane 22, and the inserts 24. In a flowable state, the formable media may be liquid, small solid particles of the formable media, and/or a combination thereof.

Furthermore, the formable media may exit the vent port(s) 52 via the flex tubing (not shown) attached thereto for aiding volatiles outgas to escape from the formable media, reducing or eliminating porosity or trapped gas pockets. Porosity or trapped gas pockets may be deleterious to the density or strength of the resulting mandrel 30. The formable media may be stopped from exiting via the vent port(s) 52 by valves or pinching of the flex tubing.

Figure 23:
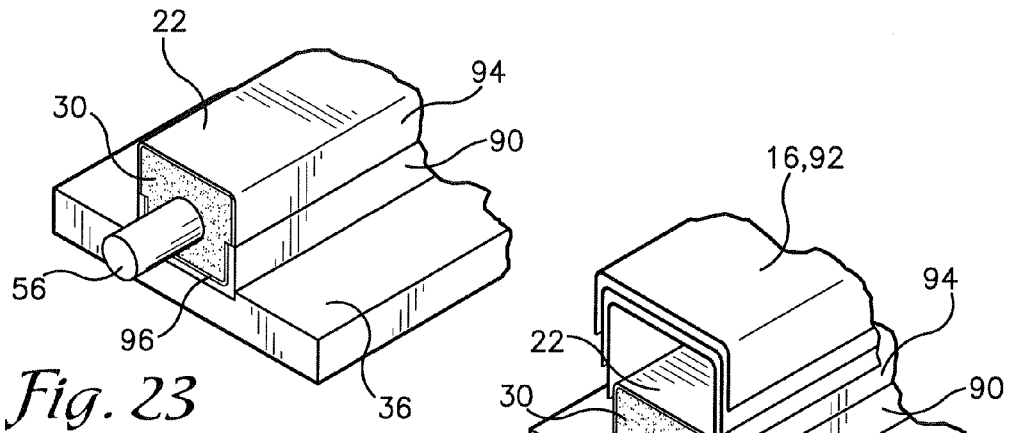
FIG. 23 is a fragmentary perspective view of the mandrel with a bottom portion of the composite part and the protective membrane attached thereto and placed on a base tool of the fabrication tooling of FIG. 6.
Figure 25:
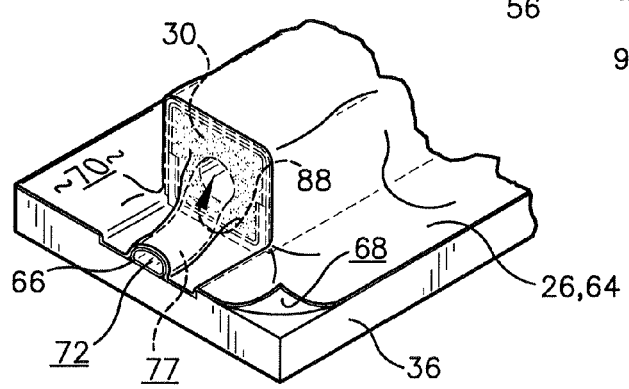
FIG. 25 is a fragmentary perspective view of the mandrel of FIG. 24 illustrating the tube insert replaced with an internal impermeable membrane and an external impermeable membrane being placed over the composite material and sealed to the tool base.

As depicted in step 3624, the formable media may be hardened via any applicable cure process, thereby resulting in the formation of mandrel 30. For example, the formable media may be left to set and cure six to twelve hours before removal of the fabrication tooling 20. The fabrication tooling 20 may be removed from the mandrel 30 and protective membrane 22, as depicted in step 3626 by unfastening any mechanical fasteners holding the various components of the fabrication tooling 20 together. In some embodiments of the invention, as illustrated in FIGS. 23-25 the tool base 36 may not be removed from the bottom portion 90 of the composite part 10 and the mandrel 30, while in other embodiments of the invention, each component of the fabrication tooling 20 is removed, as in FIGS. 18 and 26. Any exposed protective membrane 22 around the mandrel 30 may then be covered with thin TEFLON or TEFLON tape. For example, the upper portion 94 of the protective membrane 22 may be covered with TEFLON.

The upper portion 94 of the protective membrane 22 may then be segmented, as depicted in step 3628 and FIGS. 18 and 20. For example, as described above, the lower portion 96 of the protective membrane 22 may be segmented prior to formation of the mandrel 30, while segmenting of the upper portion 94 of the protective membrane 22 may be performed after the mandrel 30 is formed. However, the protective membrane 22 may be segmented in any order or at any point during the method 3600.

In one embodiment of the invention, thin cuts may be made in the protective membrane 22, such as axial cuts and crosscuts patterned as illustrated in FIGS. 18 and 20 to facilitate easy extraction of the protective membrane 22 after removal of the mandrel 30, as described below. Cut lines between segments of the protective membrane 22 may be sealed together with TEFLON tape to prevent resin ingress.

In some embodiments of the invention, segments of the protective membrane 22 may be patterned, tooled, or cut in such a manner that they overlap with each other, as illustrated in FIGS. 21-22. Additionally or alternatively, thin wire (not shown) may be placed in the mold or tool cap 40 prior to spray, paint, or roll-on application of the protective membrane 22, such that the wire may later be pulled out through the hardened protective membrane 22 during the segmenting steps 3610 and/or 3628. An acrylic adhesive film may be applied to hold the wire against the mold or tool cap 40 until pulled, providing minimum resistance to peel or tension loads.

As depicted in step 3630, at least a portion of the inserts 24 may be removed from within the mandrel 30. Specifically, the tube insert 56 may be removed from the tunnels 88 through which the internal impermeable membrane 66 may be placed.

As depicted in step 3632, composite material 16 may be placed over any exposed portions of the protective membrane 22. For example, as illustrated in FIG. 24, plies of the composite material 16 forming the second or upper portion 92 of the composite part 10 may be placed against and over the upper portion 94 of the protective membrane 22 and may partially overlap the first or bottom portion 90 of the composite part 10.

Next, the impermeable membrane 26 may be placed inward and outward of the mandrel 30, as depicted in step 3634. The internal impermeable membrane 66 may be applied as described above in step 3504 of method 3500. The external impermeable membrane 64 may also be applied as described above in the method 3500 according to step 3506. Additionally or alternatively, the external impermeable membrane 64 may be placed over the mandrel 30 and composite material 16 and sealed to the base tool 36 and the internal impermeable membrane 66, as illustrated in FIG. 25.

As depicted in step 3636, the impermeable membrane 26 may then be compressed via vacuum, removing the air between the external and internal impermeable membranes 64,66. The vacuum pressure is thus applied to both the inner and outer surfaces 12,14 of the resulting composite part 10. The composite material 16 compressed by the impermeable membrane 26 may then be cured, as depicted in step 3638, just as described above in step 3510 of the method 3500, followed by removal of the impermeable membrane 26, as depicted in step 3640 and described above in step 3512 of the method 3500.

Figure 27:
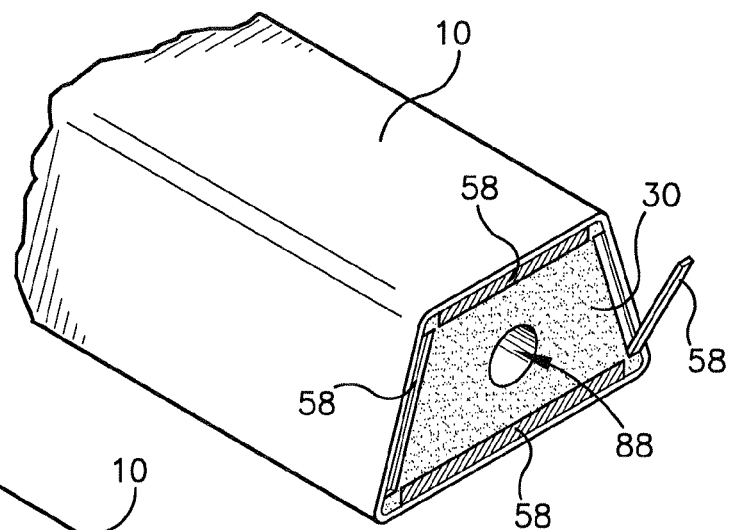
FIG. 27 is a fragmentary perspective view of the composite part after cure, illustrating removal of spacer blocks from the mandrel.

As depicted in step 3642, the remaining spacer blocks 58 may then be removed from the mandrel 30 and clips 98 may be attached to hold the protective membrane 22 to the composite part 10, as depicted in step 3644 and illustrated in FIGS. 27-28. The mandrel 30 may then be removed from within the composite part 10, as depicted in step 3646 and described in step 3514 of the method 3500.

The protective membrane 22 protects the inner surface 14 of the composite part 10 during removal of mandrel 30, such as by glass or plastic bead blasting of the mandrel 30. Following removal of the mandrel 30, the clips 98 may be removed from the protective membrane 22 and the protective membrane may be pulled out from the composite part 10, as depicted in step 3648.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of forming a composite part having an external surface and an internal surface, the method comprising:
    placing composite material around a mandrel having a hollow inner area;
    inserting an internal impermeable membrane into the hollow inner area of the mandrel;
    placing an external impermeable membrane around at least a portion of the composite material;
    sealing portions of the internal impermeable membrane to portions of the external impermeable membrane forming an airtight envelope around the mandrel and the composite material;
    removing air from between the internal impermeable membrane and the external impermeable membrane such that the internal and external impermeable membrane compress the mandrel and composite material toward each other;
    heating the mandrel, the composite material, and the impermeable membranes to cure the composite material, thereby forming the composite part; and
    removing the internal and external impermeable membranes and the mandrel from the composite part.

2. The method of claim 1, wherein the mandrel has a monolithic, complex, trapped geometry.

3. The method of claim 1, wherein the mandrel has a monolithic grid or monolithic crossed-beam configuration.

4. The method of claim 1, wherein the mandrel is fragmented and removed from within the composite part by media blast, thermal shock, mechanical shock, or differential positive air pressure.

5. The method of claim 1, wherein the mandrel is made of a solidified formable media.

6. The method of claim 5, wherein the formable media is at least one of urethane, ceramic, carbon-carbon, coal-carbon, carbon foam, any liquid-reacting expanding foam filler, borosilicate glass, injectable expanding polyurethane foam, thermally transitive materials, eutectic salts, cured silicones, differential coefficient of thermal expansion metals, and composites.

7. The method of claim 5, wherein the hollow inner area of the mandrel includes a plurality of intersecting tube-shaped channels forming a grid or crossed-beam configuration.

8. The method of claim 5, further comprising placing a protective membrane against an outer surface of the mandrel prior to placing composite material around the mandrel, wherein the protective membrane is between the mandrel and the composite material.

9. The method of claim 8, further comprising dividing the protective membrane into a plurality of sections for ease of removal from within the composite part and removing the protective membrane from the composite part after the mandrel is removed therefrom.

10. The method of claim 8, wherein the protective membrane is a hardened protective membrane, wherein the combined size and shape of the mandrel and the protective membrane placed on the mandrel corresponds with the size and shape of the internal surface of the composite part.

11. A method of forming a composite part having an external surface and an internal surface, the method comprising:
    forming a mandrel made of solidified formable media having a hollow inner area with at least two open ends within a hardened protective membrane, such that the protective membrane rests against an outer surface of the mandrel, wherein the combined size and shape of the mandrel and the protective membrane placed on the mandrel corresponds with the size and shape of the internal surface of the composite part;
    placing composite material around the protective membrane;
    inserting an internal impermeable membrane into the hollow inner area of the mandrel;
    placing an external impermeable membrane around the composite material;
    sealing end portions of the internal impermeable membrane to the external impermeable membrane;
    removing air from between the internal and external impermeable membranes;
    heating the mandrel, protective membrane, composite material, internal impermeable membrane, and external impermeable membrane to cure the composite material, changing the composite material into the composite part; and
    removing the external impermeable membrane, the internal impermeable membrane, the mandrel, and the protective membrane from the composite part.

12. The method of claim 11, wherein the mandrel has a trapped geometry.

13. The method of claim 11 wherein at least a portion of the mandrel is shaped as at least one of a monolithic lattice, a monolithic grid, a monolithic crossed-beam configuration, and a monolithic complex contoured shape.

14. The method of claim 11, further comprising the step of dividing the protective membrane into a plurality of sections for ease of removal from within the composite part.

15. The method of claim 11, wherein the formable media is at least one of urethane, ceramic, carbon-carbon, coal-carbon, carbon foam, any liquid-reacting expanding foam filler, borosilicate glass, injectable expanding polyurethane foam, thermally transitive materials, eutectic salts, cured silicones, differential coefficient of thermal expansion metals, and composites.

16. The method of claim 11, wherein the mandrel is fragmented and removed from within the composite part by media blast, thermal shock, mechanical shock, or differential positive air pressure coupled with vacuum.

17. The method of claim 11, wherein the hollow inner area of the mandrel includes a plurality of intersecting tube-shaped channels forming a grid or crossed-beam configuration.

* * * * *